(12) United States Patent
Shah et al.

(10) Patent No.: US 7,365,333 B1
(45) Date of Patent: Apr. 29, 2008

(54) $LU_xY_{(1-x)}XA_3$ SCINTILLATORS (75) Inventors: Kanai S. Shah, Newton, MA (US); William M. Higgins, Westborough, MA (US); Edgar V Van Loef, Allston, MA (US); Jaroslaw Glodo, Allston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 11/754,200

(22) Filed: May 25, 2007

Related U.S. Application Data (60) Provisional application No. 60/808,601, filed on May 26, 2006.

(51) Int. Cl.
*G01T 1/202* (2006.01)

(52) U.S. Cl. .................................. 250/361 R

(58) Field of Classification Search ......... 250/301.4 R, 250/484.4, 484.2, 483.1, 361 R; 252/301.4 H
See application file for complete search history.

(56) References Cited

U.S. PATENT DOCUMENTS

| | | | |
|---|---|---|---|
| 4,559,597 | A | 12/1985 | Mullani |
| 5,869,836 | A | 2/1999 | Linden et al. |
| 6,255,655 | B1 | 7/2001 | McCroskey et al. |
| 6,624,422 | B2 | 9/2003 | Williams et al. |
| 6,872,937 | B2 | 3/2005 | Williams et al. |
| 7,129,494 | B2 | 10/2006 | Shah |
| 2003/0062465 | A1* | 4/2003 | Pauwels et al. ............. 250/205 |
| 2004/0129886 | A1* | 7/2004 | Lecoq .................... 250/363.03 |
| 2005/0082484 | A1 | 4/2005 | Srivastava et al. |
| 2006/0011845 | A1* | 1/2006 | Chai et al. ............... 250/361 R |
| 2006/0197027 | A1* | 9/2006 | Dorenbos et al. ....... 250/370.11 |
| 2006/0237654 | A1* | 10/2006 | Srivastava et al. ..... 250/370.11 |
| 2007/0210256 | A1* | 9/2007 | Dorenbos et al. ........ 250/361 R |
| 2007/0221856 | A1* | 9/2007 | Eriksson et al. ............ 250/368 |
| 2007/0267576 | A1* | 11/2007 | Loureiro et al. ............ 250/362 |
| 2007/0272898 | A1* | 11/2007 | Yoshikawa et al. .. 252/301.4 H |

FOREIGN PATENT DOCUMENTS

WO   WO 2004/109331 A2   12/2004

OTHER PUBLICATIONS

Rodnyi P.A.; "Progress in Fast Scintillators"; Feb. 11, 2001; Radiation Measurements; vol. 33; pp. 605-614.*

(Continued)

*Primary Examiner*—David Porta
*Assistant Examiner*—David S Baker
(74) *Attorney, Agent, or Firm*—Townsend and Townsend and Crew LLP (57) ABSTRACT

The present invention concerns scintillators comprising a composition having the formula $Lu_xY_{(1-x)}Xa_3$, wherein Xa is a halide, and a dopant. The $Lu_xY_{(1-x)}Xa_3$ and dopant material has surprisingly good characteristics including high light output, high gamma-ray stopping efficiency, fast response, low cost, and minimal afterglow, thereby making the material useful for various applications including, for example, gamma-ray spectroscopy, medical imaging, nuclear and high energy physics research, diffraction, non-destructive testing, nuclear treaty verification and safeguards, geological exploration, and the like. The timing resolution of the scintillators of the present invention also provides compositions suitable for use in imaging applications, such as positron emission tomography (e.g., time-of-flight PET) and CT imaging.

35 Claims, 4 Drawing Sheets

OTHER PUBLICATIONS

Guedes K.J., Krambrock K., Gesland J.Y.; "Identification of Trivalent Rare Earth Impurities in YF3, LuF3 and LiYF4 by Electron Paramagnetic Resonance"; 2002; Journal of Alloys and Compounds; vol. 344; pp. 251-254.*

Annenkov A., Fedorov A., Korzhik M., Lecoq P., Missevitch O.; "First Results on Prototype Production of New LuYAP Crystals"; 2004; Nuclear Instruments and Methods in Physics Research A; vol. 527; pp. 50-53.*

Bollinger and Thomas, "Measurement of the Time Dependence of Scintillation Intensity by a Delayed-Coincidence Method," *Rev. Sci. Instr.* 32:1044-1050 (1961).

Derenzo et al., "The Quest for the Ideal Scintillator," *Nucl. Inst. Meth. Physics Res. A* 505:111-117 (2003).

Derenzo and Moses, "Experimental Efforts and Results in Finding New Heavy Scintillators," *Heavy Scintillators for Scientific and Industrial Applications*, F. De Notaristefani et al. eds., Gif-sur-Yvette, France: Editions Frontieres, pp. 125-135 (1993).

Moses, "Current Trends in Scintillator Detectors and Materials," *Nucl. Inst. Meth.* A-487:123-128 (2002).

van Eijk, "New Scintillators, New Light Sensors, New Applications," *Proc. Int. Conf. Inorganic Scintill. Appl.*, pp. 3-12, Shanghai, China (1997).

van Loef et al., "Scintillation Properties of $LaBr_3:Ce^{3+}$ Crystals: Fast, Efficient and High-Energy-Resolution Scintillators," *Nucl. Instr. Meth. Physics Res. A* 486:254-258 (2002).

Shah, "$CeBr_3$ Scintillator," U.S. Appl. No. 11/233,715, filed on Sep. 23, 2005.

* cited by examiner

$Lu_xY_{(1-x)}XA_3$ SCINTILLATORS

CROSS-REFERENCE TO RELATED APPLICATION

The present invention claims the benefit of priority under 35 U.S.C. § 119(e) of U.S. Application No. 60/808,601, filed May 26, 2006, the entire content of which is incorporated herein by reference.

BACKGROUND OF THE INVENTION

The present invention relates to a scintillator. More specifically, the present invention relates to a $Lu_xY_{(1-x)}Xa_3$ scintillator for use, for example, in radiation detection, including gamma-ray spectroscopy and X-ray emission detection.

Scintillation spectrometers are widely used in detection and spectroscopy of energetic photons (e.g., X-rays and γ-rays). Such detectors are commonly used, for example, in nuclear and particle physics research, medical imaging, diffraction, non destructive testing, nuclear treaty verification and safeguards, nuclear non-proliferation monitoring, and geological exploration (Knoll *Radiation Detection and Measurement*, 3rd Edition, John Wiley and Sons, New York, (1999), Kleinknecht, *Detectors for Particle Radiation*, 2nd Edition, Cambridge University Press, Cambridge, U.K. (1998)).

Some important requirements for the scintillation materials used in these applications include, for example, high light output, transparency to the light it produces, high stopping efficiency, fast response, good proportionality, low cost and availability in large volume. Unfortunately, many of these requirements cannot be met by any of the commercially available scintillators.

Some commonly used scintillator materials include thallium-activated sodium iodide (NaI(Tl)), bismuth germanate (BGO), cerium-doped gadolinium orthosilicate (GSO), and cerium-doped lutetium orthosilicate (LSO). While these known scintillator materials do have some desirable scintillation characteristics which make them suitable for certain applications, each of the materials possesses one or more deficiencies that limit their use in a variety of applications. For example, many currently available scintillation materials have low light output characteristics, poor timing resolution (e.g., slow decay time or rise time), or low X-ray or gamma-ray stopping power. Some available materials also have emission spectra not optimally matched for use with certain commonly available photodetectors or have limited temperature ranges at which scintillation is practical or possible. In some instances, utility of certain available scintillators is limited due, for example, to absorption of oxygen and moisture leading to persistent afterglow and high background rate due to radioactive isotope of component elements.

While candidate scintillators or general classes of chemical compositions may be known or may even be identified as potentially having some scintillation characteristic(s), specific compositions/formulations having both scintillation characteristics and physical properties necessary for actual use in scintillation spectrometers and various practical applications have proven difficult to predict. Specific scintillation properties are not necessarily predictable from chemical composition alone, and preparing effective scintillators from even candidate materials often proves difficult. For example, while the composition of sodium chloride had been known for many years, the invention by Hofstadter of a high light-yield and conversion efficiency scintillator from sodium iodide doped with thallium launched the era of modern radiation spectrometry. More than half a century later, thallium doped sodium iodide, in fact, still remains one of the most widely used scintillator materials. Since the invention of NaI(Tl) scintillators in the 1940's, for half a century radiation detection applications have depended to a significant extent on this material. The fields of nuclear medicine, radiation monitoring and spectroscopy have grown up supported by NaI(Tl). Although far from ideal, NaI(Tl) was relatively easy to produce for a reasonable cost and in large volume. With the advent of X-ray CT in the 1970's, a major commercial field emerged as did a need for different scintillators, as NaI(Tl) was not able to meet the requirements of CT imaging. Later, the commercialization of PET imaging provided the impetus for the development of yet another class of detector materials with properties suitable for PET. As the methodology of scintillator development evolved, new materials have been added, and yet, specific applications are still hampered by the lack of scintillators suitable for particular applications.

As a result, there is continued interest in the search for new scintillators and formulations with both the enhanced performance and the physical characteristics needed for use in various applications (Derenzo, in, *Heavy Scintillators for Scientific and Industrial Applications*, De Notaristefani et al. eds., Gif-sur-Yvette, France (1993), pp. 125-135; van Eijk, Lecoq, *Proc. Int. Conf. Inorganic Scintill. Appl.*, pps. 3-12, Shanghai, China, (1997); Moses, *Nucl. Inst. Meth.* A-487: 123-128 (2002)). Today, the development of new scintillators continues to be as much an art as a science, since the composition of a given material does not necessarily determine its properties as a scintillator, which are strongly influenced by the history (e.g., fabrication process) of the material as it is formed. While it is may be possible to reject a potential scintillator for a specific application based solely on composition, it is not possible to predict whether a material with promising composition will produce a scintillator with the desired properties.

Thus, a need exists for improved scintillator compositions suitable for use in various radiation detection applications. In particular, new scintillator materials are needed that can be efficiently and economically produced and that exhibit characteristics which enhance radiation detection, including, for example, high light output, high stopping efficiency, fast response, good proportionality, and minimal afterglow.

BRIEF SUMMARY OF THE INVENTION

The present invention provides a $Lu_xY_{(1-x)}Xa_3$ scintillator, properties of which are disclosed herein. The scintillator compositions of the present invention are particularly useful, for example, for spectroscopy detection of energetic photons (e.g., X-rays and gamma-rays). Notable characteristics for the scintillation compositions of the invention include surprisingly robust light output, high stopping efficiency (attenuation), and fast response. In one embodiment, the scintillator compositions of the present invention include a combination of high light output and fast timing (e.g., fast decay time, timing resolution, etc.) that is virtually unmatched among commercially available scintillator compositions. Furthermore, the scintillator compositions can be efficiently and economically produced. Thus, detectors comprising a $Lu_xY_{(1-x)}Xa_3$ scintillator composition are useful in a wide variety of applications, including without limitation nuclear and high energy physics research, medical imaging, diffraction, non-destructive testing, nuclear treaty verification and safeguards, and geological exploration.

The scintillator compositions comprise a ratio of Lutetium (Lu) and Yttrium (Y). This ratio is established by the subscript "x", which can take any value between 0 and 1. In the scintillator material of the invention, $Lu^{3+}$ and $Y^{3+}$ each serve as an intrinsic constituent. The $Lu_xY_{(1-x)}Xa_3$ scintillator compositions of the invention typically comprise a halide (herein referred to as "Xa"), and thereby may comprise, for example, Lutetium Iodide ($LuI_3$) or Lutetium Bromide ($LuBr_3$), or Yttrium Iodide ($YI_3$) or Yttrium Bromide ($YBr_3$), although the composition may include other halides. In one embodiment, crystals of $Lu_{0.7}Y_{0.3}I_3$ ($Z_{average}$ is approximately 55, wherein Z is the atomic number) doped with cerium have been grown using the Bridgman process and their scintillation properties have been characterized. The gamma-ray stopping efficiency of this material is comparable or significantly higher than the most common scintillation detection compositions. (e.g., NaI:Tl ($Z_{average}$=32, significant), CsI:Tl ($Z_{average}$=54), $BaF_2$ ($Z_{average}$ approximately 25)). Desirable scintillation properties including high light output and fast response have been measured for the $Lu_xY_{(1-x)}Xa_3$ compositions. Based on results disclosed herein, $Lu_xY_{(1-x)}Xa_3$ compositions were demonstrated to be suitable for use as scintillators in a wide variety of applications (e.g., gamma-ray spectroscopy, X-ray detection, and the like).

As set forth above, characteristics for the scintillation compositions of the invention include robust light output, high stopping efficiency (attenuation), and fast response. In one embodiment, scintillation properties of $Lu_xY_{(1-x)}Xa_3$ crystals (e.g., <0.3 cm$^3$) included a peak emission wavelength for $Lu_{0.7}Y_{0.3}I_3$:2% Ce at approximately 520 nm, which is well matched to PMTs as well as silicon diodes used in nuclear instrumentation and for gamma-ray spectroscopy. Scintillator compositions of the present invention include fast timing scintillators, with a rapid rise time and a fast decay-time constant. Rise time of the scintillator compositions will typically be less than about 1.0 nanosecond (ns) and more typically about 0.5 ns or less. Decay time constant, in one embodiment, will be less than about 100 ns, or less than about 50 ns, and more typically less than about 30 ns. The principal decay-time constant in one instance was measured at about 28 ns, which is faster than the decay-time constant of commercial scintillators such as BGO, LSO, NaI:Tl and GSO (see, e.g., Table 1 below). Scintillator compositions will typically include a light output greater than about 30,000 photons/MeV, and more typically greater than about 40,000 photons/MeV. The light output of $Lu_{0.7}Y_{0.3}I_3$:2% Ce in one embodiment was measured at about 46,000 photons/MeV, which is comparable to and/or greater than that of many commercial scintillators.

The measured initial photon intensity in the described scintillator compositions, which is a figure of merit for timing applications, is also higher compared to other available commercial scintillator compositions. Initial photon intensity will typically be greater than about 1000 photons/ns×MeV or greater than about 1500 photons/ns×MeV (e.g., 1640 photons/ns×MeV). The combination of high light output and fast response compared to existing scintillators indicates surprisingly high energy and timing resolution with $Lu_xY_{(1-x)}Xa_3$ scintillators. These properties are very attractive in radiation monitoring and detection applications, in general, and in imaging applications, such as positron emission tomography (PET) imaging, in particular. Thus, the scintillators of the invention provide the opportunity for use in applications requiring a fast scintillator, such as time-of-flight (TOF) PET imaging, which thereby, e.g., would provide additional gain in signal to noise ratio and image quality. Due to its high atomic number constituents and high density (approximately 5.6 g/cm$^2$) $Lu_xY_{(1-x)}Xa_3$ scintillator compositions provide high gamma-ray sensitivity. Attenuation length will typically be less than about 2.0 cm (511 keV). The mean penetration depth of a 511 keV photon into $Lu_{0.7}Y_{0.3}I_3$:2% was estimated in one example to be about 1.7 cm, which is comparable to or slightly larger than other commercial scintillators.

Since lutetium halides and yttrium halides melt congruently, $Lu_xY_{(1-x)}Xa_3$ scintillator compositions can be grown using crystal growth techniques such as Bridgman and Czochralski, which are generally easy to scale-up. For example, the melting point of $LuI_3$ is 1050° C., and the melting point of $YI_3$ is 997° C., both of which are substantially lower than the melting point of LSO and GSO (>2000° C.). As a result, the eventual cost of $Lu_xY_{(1-x)}Xa_3$ scintillator compositions can be expected to be considerably lower than that of other commercial scintillators such as LSO and GSO. This issue is particularly relevant in modern instrumentation (e.g., PET instrumentation) where the high cost of the detector components can be a major limitation to commercial application.

Lutetium and yttrium may be present at various concentrations and ratios in the $Lu_xY_{(1-x)}Xa_3$ scintillator compositions. Certain properties of the scintillator composition may be effected based on the relative concentrations and ratios of lutetium and yttrium in the scintillator materials. For example, lutetium has an atomic number of 71, whereas yttrium has an atomic number of 39. Stopping power of energetic photons (e.g., X-ray stopping power) typically increases with increased concentrations of composition constituents having a high atomic number. Thus, in certain embodiments of the scintillation compositions of the present invention, X-ray stopping power can be increased, for example, by increasing the relative concentration of lutetium with respect to yttrium. Lutetium is typically present at a molar ratio, with respect to yttrium, of less than or equal to about 1(Lu):0(Y) (e.g., wherein $1 \geq x \geq 0$), and typically more than 0.1(Lu):0.9(Y) (e.g., wherein x is greater than about 0.1). In a particular embodiment, lutetium is present at a molar ratio, with respect to yttrium, of about 0.7(Lu):0.3 (Y) (e.g., wherein x is about 0.7).

In certain embodiments of the present invention, the $Lu_xY_{(1-x)}Xa_3$ composition can be doped. In particular, the $Lu_xY_{(1-x)}Xa_3$ composition can be doped with cerium, e.g., $Ce^{3+}$, and the like. Additional dopants can include, but are not limited to La, Eu, Pr, Sm, Sr, Tl, Cl, F, and I. In some cases, a dopant can include a mixture of dopants (e.g., two or more dopants). The dopant is typically present at about 0.1% or more and less than or equal to about 100% by molar weight, and in some cases from about 0.1% to about 5.0% by molar weight, or from about 5.0% to about 20% by molar weight.

In one aspect of the present invention, a radiation detection device is provided that comprises a detector assembly comprising a scintillator comprising a composition having the formula $Lu_xY_{(1-x)}Xa_3$, wherein Xa is a halide; and a dopant; and a photon detection assembly. Lutetium and yttrium may be present at various concentrations and ratios in the $Lu_xY_{(1-x)}Xa_3$ scintillator compositions, as set forth above. The halide of the scintillator composition can include, for example, iodide or bromide, as well as other halides. The dopant can include a single dopant or a mixture of dopants (e.g., at least two dopants) and can include, for example, Ce, La, Eu, Pr, Sm, Sr, Tl, Cl, F, or I. The scintillator composition can include a crystal composition or compositions such as ceramics, glasses, deposits, vapor deposited films, and the like. The photon detection assembly can comprise, for example, a photomultiplier tube, a photo diode, or a PIN detector. The device may further include a data analysis system for processing and analyzing detected signals. A data analysis system can be easily adapted from electronic/analysis systems known in the art for signal detection using scintillators.

In another aspect, the invention comprises an X-ray detector assembly, wherein the X-ray detector assembly comprises a scintillator comprising a composition having the formula $Lu_xY_{(1-x)}Xa_3$, wherein Xa is a halide; and a dopant, a photon detection assembly, and a data analysis system. The photon assembly can comprise a photomultiplier tube, a photo diode, a PIN detector, or the like. The scintillator composition (e.g., crystal) can be coated, for example, with a reflective layer, a moisture resistant layer, or a vapor barrier, and the like. The reflective layer is typically to cover the surfaces of the scintillator composition not exposed to the photon detector assembly.

In another aspect, the invention includes a method of performing radiation detection. The method including providing a detection device comprising a detector assembly comprising a scintillator comprising a composition having the formula $Lu_xY_{(1-x)}Xa_3$, wherein Xa is a halide; and a dopant, and a photon detection assembly; and positioning a target within a field of view of the scintillator as to detect emissions from the target. Emissions can include, for example, gamma-ray, X-ray, and the like. Targets for detection may include any source of detectable signal. A target can include, e.g., any potential source of detectable emissions, such as, gamma-ray sources (e.g., uranium and the like), X-ray sources, etc. In one embodiment, for example, the scintillator compositions can be used for imaging applications including medical imaging such as in a method of performing PET (e.g., time-of-flight PET). In such an embodiment, the imaging method can comprise injecting or otherwise administering a patient with a detectable label and, after a sufficient period of time to allow localization or distribution of the label, placing the patient within the field of view of the detection device. Thus, in some embodiments the target includes a patient or a portion of a patient's body. In some applications an X-ray source is positioned within the field of view of the detector and an absorber is placed between them, so that the data obtained comprise absorption characteristics of the object.

For a more complete understanding of the nature and advantages of the present invention, reference should be made to the ensuing detailed description taken in conjunction with the accompanying drawings. The drawings represent embodiments of the present invention by way of illustration. The invention is capable of modification in various respects without departing from the invention. Accordingly, the drawings/figures and description of these embodiments are illustrative in nature, and not restrictive.

DETAILED DESCRIPTION OF THE INVENTION

This invention will be better understood with resort to the following definitions:

A. Rise time, in reference to a scintillation crystal material, shall mean the speed with which its light output grows once a gamma-ray has been stopped in the crystal. The contribution of this characteristic of a scintillator combined with the decay time contribute to a timing resolution. A timing resolution of less than 500 picoseconds (ps) is of particular interest for use in methods comprising time-of-flight detection of an annihilation event as originating within about a 30 cm distance.

B. A Fast timing scintillator (or fast scintillator) typically requires a timing resolution of about 500 ps or less. For certain PET applications (e.g., time-of-flight (TOF)) the fast scintillator should be capable of localizing an annihilation event as originating from within about a 30 cm distance, i.e., from within a human being scanned.

C. Timing accuracy or resolution, usually defined by the full width half maximum (FWHM) of the time of arrival differences from a point source of annihilation gamma-rays. Because of a number of factors, there is a spread of measured values of times of arrival, even when they are all equal. Usually they distribute along a bell-shaped or Gaussian curve. The FWHM is the width of the curve at a height that is half of the value of the curve at its peak.

D. Light Output shall mean the number of light photons produced per unit energy deposited by the detected gamma-ray, typically the number of light photons/MeV.

E. Stopping power or attenuation shall mean the range of the incoming X-ray or gamma-ray in the scintillation crystal material. The attenuation length, in this case, is the length of crystal material needed to reduce the incoming beam flux to $1/e^-$.

F. Proportionality of response (or linearity). For some applications (such as CT scanning) it is desirable that the light output be substantially proportional to the deposited energy.

G. Coincidence timing window/coincidence detection shall mean the length of time allowed for deciding whether two distinct gamma-rays have been detected. In PET, this window is desired to be as short as possible, but no shorter than the time it takes the gamma-rays to travel through the body (>1 nsec).

H. Single line time-of-flight (TOF) localization shall mean the process by which, through timing of the signals, the position of the annihilation event is localized to a portion of the line joining the detectors, this portion being smaller than the length of the line.

I. Position sensitive detector or array shall mean a detector where the position of the energy signal (e.g., gamma-ray, X-ray, neutron, etc.) interaction within the detector is determined. In some embodiments this is done through the Anger principle of light division (well known in the state of the art). For instance, there can be a photodetector at each end of the scintillator composition and the proportion of light reaching each detector determines position, or an array of photodetectors where the center of mass of the light distribution determines position (i.e., the closest detectors get more light).

J. Method to correct for different timing offsets of an individual detector shall be understood to include, among others, software code that stores each detector's individual timing delay and code to subtract from each timing signal this pre-stored value. Method to introduce through delay lines (cables through which the signal travels) a fixed delay for each detector, so that their signals all have the same arrival delay at the timing electronics.

The present invention provides a $Lu_xY_{(1-x)}Xa_3$ scintillator, properties of which are disclosed herein. The scintillator compositions comprise a ratio of Lutetium (Lu) and Yttrium (Y). In the scintillator material of the invention, $Lu^{3+}$ and $Y^{3+}$ each serve as an intrinsic constituent. For example, the dopant $Ce^{3+}$ is a luminescence center, the emission wavelength of 520 nm being consistent with the 5d→4f transition of $Ce^{3+}$. The $Lu_xY_{(1-x)}Xa_3$ scintillator compositions of the invention typically comprise a halide (herein referred to as "Xa"), and thereby may comprise, for example, Lutetium Iodide ($LuI_3$) or Lutetium Bromide ($LuBr_3$), or Yttrium Iodide ($YI_3$) or Yttrium Bromide ($YBr_3$), although the composition may include other halides.

The scintillators of the invention are particularly useful, for example, for spectroscopy detection of energetic photons (e.g., X-rays and gamma-rays). Notable characteristics for the scintillation compositions of the invention include surprisingly robust light output, high gamma-ray stopping efficiency (attenuation), and fast response. Furthermore, the scintillator compositions can be efficiently and economically produced. Thus, detectors comprising a $Lu_xY_{(1-x)}Xa_3$ scintillator composition of the invention are useful in a wide variety of applications, including without limitation nuclear and high energy physics research, medical imaging, diffraction, non-destructive testing, nuclear treaty verification and safeguards, and geological exploration.

The scintillator composition of the present invention typically includes a "dopant". These dopants can effect certain properties, such as physical properties (e.g., brittleness, and the like) as well as scintillation properties (e.g., luminescence, and the like), of the scintillator composition. The dopant can include, for example, cerium (Ce), praseodymium (Pr), or mixtures of cerium and praseodymium. Cerium is a particularly good dopant for use in scintillator compositions of the invention because, for example, it imparts high luminescence efficiency, good timing resolution, and short decay time, as well as suitable physical properties (e.g., limited brittleness, and the like) to the scintillator composition of the present invention. The dopant is usually employed in its trivalent form, for example $Ce^{3+}$ or $Pr^{3+}$, and is supplied in various forms, e.g., halides, such as cerium chloride or cerium bromide. Other dopants in the scintillator compositions of the invention include, for example, lanthanum (La), europium (Eu), samarium (Sm), strontium (Sr), thallium (Tl), chlorine (Cl), fluorine (F), iodine (I), and mixtures of dopants.

The amount of dopant present will depend on various factors, such the application for which the scintillator composition is being used; the desired scintillation properties (e.g., emission properties, timing resolution, etc.); and the type of detection device into which the scintillator is being incorporated. For example, the dopant is typically employed at a level in the range of about 0.1% to about 20%, by molar weight. In many embodiments, the amount of dopant is in the range of about 0.1% to about 100%, or about 0.1% to about 5.0%, or about 5.0% to about 20%, by molar weight.

The $Lu_xY_{(1-x)}Xa_3$ scintillator composition of the invention may be prepared in several different forms. In some embodiments, the composition is in crystalline form (e.g., monocrystalline). Scintillation crystals, such as monocrystalline scintillators, have a greater tendency for transparency than other forms. Scintillators in crystalline form (e.g., scintillation crystals) are often useful for high-energy radiation detectors, e.g., those used for gamma-ray or X-ray detection.

However, the $Lu_xY_{(1-x)}Xa_3$ scintillator composition can be in other forms as well and the selected form may depend, in part, on the intended end use of the scintillator. For example, a scintillator can be in powder form. It can also be prepared in the form of a ceramic or polycrystalline ceramic. Other forms of scintillation compositions will be recognized and can include, for example, glasses, deposits, vapor deposited films, and the like. It should also be understood that scintillator compositions might contain small amounts of impurities. For example, minor amounts of other materials may be purposefully included in the scintillator compositions to effect the properties of the scintillator compositions.

Methods for making crystal materials, generally, are also well-known in the art. (see, e.g., "Luminescent Materials", by G. Blasse et al, Springer-Verlag (1994)). Typically, the appropriate reactants are melted at a temperature sufficient to form a congruent, molten composition. The melting temperature will depend on the identity of the reactants themselves (see, e.g., melting points of reactants), but is usually in the range of about 300° C. to about 1500° C. In particular, the melting point for TlF is 326° C. and for $LaF_3$ the melting point is 1493° C.

A variety of techniques can be employed for forming crystals from the molten composition. (see, e.g., "Crystal Growth Processes", by J. C. Brice, Blackie & Son Ltd (1986)). Non-limiting examples of the crystal-growing techniques are the Bridgman-Stockbarger method; the Czochralski method, the zone-melting method (or "floating zone" method), and the temperature gradient method (vertical gradient freeze or VGF). Those skilled in the art will be familiar with the necessary details regarding each of these processes (see also, Example 1 below)

In the practice of the present invention, attention is paid to the physical properties of the scintillator material. In particular applications, properties such as hygroscopy (tendency to absorb water), brittleness (tendency to crack), and crumbliness should be minimal.

TABLE I

Properties of Scintillators

| Material | Light Output (Photons/MeV) | Wavelength of Emission (nm) | Attenuation Length (511 keV) (cm) | Initial Photon Intensity (Photons/(ns MeV)) | Principal Decay Time (ns) |
|---|---|---|---|---|---|
| NaI(Tl) | 38,000 | 415 | 3.3 | 165 | 230 |
| CsI(Tl) | 52,000 | 540 | 1.9 | 50 | 1000 |

TABLE I-continued

Properties of Scintillators

| Material | Light Output (Photons/MeV) | Wavelenght of Emission (nm) | Attenuation Length (511 keV) (cm) | Initial Photon Intensity (Photons/(ns MeV)) | Principal Decay Time (ns) |
|---|---|---|---|---|---|
| LSO | 24000 | 420 | 1.2 | 600 | 40 |
| BGO | 8,200 | 505 | 1.1 | 30 | 300 |
| BaF$_2$ | 10,000 | 310 slow | 2.3 | 3,400 (total) | 620 slow |
|  | ~2,000 fast | 220 fast |  |  | 0.6 fast |
| GSO | 7,600 | 430 | 1.5 | 125 | 60 |
| CdWO$_4$ | 15,000 | 480 | 1.1 | 3 | 5000 |
| YAP | 20,000 | 370 | 2.1 | 570 | 26 |
| LaBr$_3$ (0.5% Ce)[1] | 61,000 | 360 | 2.1 | 1,850 | 31 |
| Lu$_{0.7}$Y$_{0.3}$I$_3$:2% Ce | 46,000 | 520 | 1.7 for LuI$_3$ | 1640 | 28 |

[1]Data based on the Delft University of Technology results (See, van Loef et al., Nucl. Inst. Meth. Phys. Res. A 486: 254-258 (2002)).

Table I provides a listing of certain properties of a number of scintillators. Compared to other commercially available scintillators, including CsI, which is among the scintillation materials with the highest known light output, Lu$_{0.7}$Y$_{0.3}$I$_3$: 2% Ce produces a comparable light output (approximately 46,000 photon/MeV). While the scintillator compositions of the present invention produce greater or comparable light output compared to established commercially available scintillators such as CsI(Tl) and NaI(Tl), the present scintillator compositions offer faster timing (e.g., decay constant), light output, than many available scintillators. For example, Lu$_{0.7}$Y$_{0.3}$I$_3$:2% Ce has a fast principal decay constant (e.g., about 28 ns), and a very fast light output (initial photons).

Figure 4:
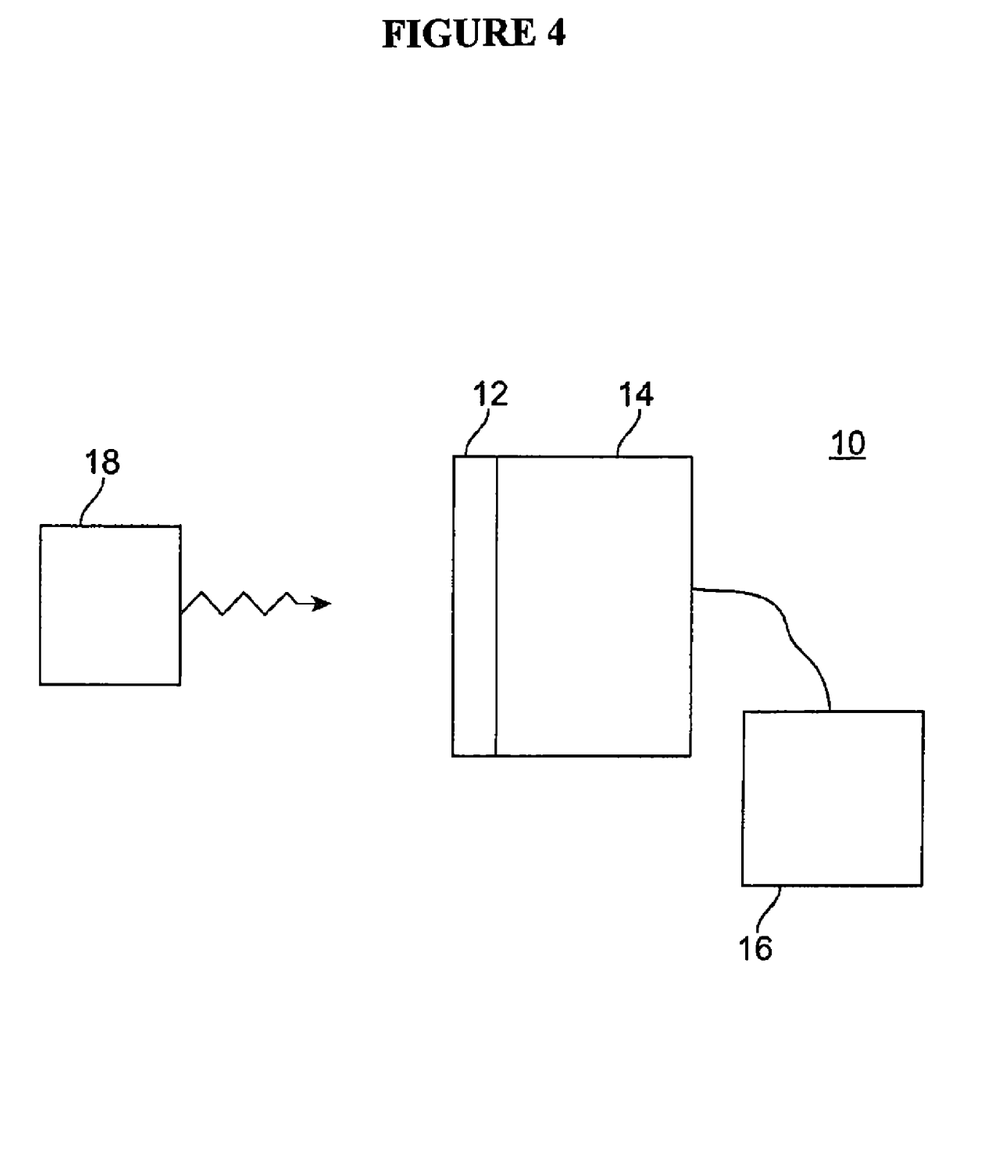
FIG. 4 is a conceptual diagram of a detector assembly of the present invention.

As set forth above, Lu$_x$Y$_{(1-x)}$Xa$_3$ scintillator compositions of the present invention may find use in a wide variety of applications. In one embodiment, for example, the invention is directed to a method for detecting energy radiation (e.g., gamma-rays, X-rays, etc.) with a scintillation detector including the Lu$_x$Y$_{(1-x)}$Xa$_3$ scintillator composition of the invention. FIG. 4 is a diagram of a detector assembly of the present invention. The detector 10 includes a scintillator 12 optically coupled to a light photodetector 14 or imaging device. The detector assembly 10 can include a data analysis system 16 to process information from the scintillator 12 and light photodetector 14. In use, the detector 10 detects energetic radiation emitted form a source 18.

A detector or data analysis system thereof can include, for example, a module or system to process information (e.g., radiation detection information) from the detector/photodetectors can also be included in an invention assembly and can include, for example, a wide variety of proprietary or commercially available computers or systems having one or more processing structures, a personal computer, mainframe, or the like, with such systems often comprising data processing hardware and/or software configured to implement any one (or combination of) the method steps described herein. Any software will typically comprise machine readable code of programming instructions embodied in a tangible media such as a memory, a digital or optical recording media, optical, electrical, or wireless telemetry signals, or the like, and one or more of these structures may be used to transmit data and information between components of the system in any of a wide variety of distributed or centralized signal processing architectures.

The detector assembly typically includes material formed from the scintillator composition described herein (e.g., one or more scintillator crystals). The detector further includes a photon detection assembly including one or more photodetectors. Non-limiting examples of photodetectors include photomultiplier tubes (PMT), photodiodes, CCD sensors, image intensifiers, and the like. Choice of a particular photodetector will depend in part on the type of radiation detector being fabricated, and on the intended use of the device.

A data analysis system, or module to process information from a light photodetector can also be included in an invention assembly and can include, for example, a wide variety of proprietary or commercially available computers or systems having one or more processing structures, a personal computer, mainframe, or the like, with such systems often comprising data processing hardware and/or software configured to implement any one (or combination of) the method steps described herein. Any software will typically comprise machine readable code of programming instructions embodied in a tangible media such as a memory, a digital or optical recording media, optical, electrical, or wireless telemetry signals, or the like, and one or more of these structures may be used to transmit data and information between components of the system in any of a wide variety of distributed or centralized signal processing architectures.

The detector assemblies themselves, which include the Lu$_x$Y$_{(1-x)}$Xa$_3$ scintillator and the photodetector assembly, can be connected to a variety of tools and devices, as mentioned previously. Non-limiting examples include nuclear weapons monitoring and detection devices, well-logging tools, and imaging devices, such as nuclear medicine devices (e.g., PET). Technologies for operably coupling or integrating a radiation detector assembly containing a scintillator to a detection device are well-known in the art, and need not be described in detail here. For non-limiting examples of techniques for operably coupling detectors containing a scintillator to a detection device see, e.g., U.S. Pat. No. 6,953,937 (titled "Method and apparatus for the detection of neutrons and gamma-rays") and WO2004/109331 (entitled "Neutron and Gamma Ray Monitor").

The detectors may also be connected to visualization interface, imaging equipment, digital imaging equipment (e.g., pixilated flat panel devices). In some embodiments, the scintillator may serve as a component of a screen scintillator. For example, powdered scintillator material could be formed into a relatively flat plate, which is attached to a film, such as photographic film. Energetic radiation, e.g., X-rays, originating from some source, would interact in the scintillator and be converted into light photons, which are visualized in the developed film. The film can be replaced by amorphous silicon position-sensitive photodetectors or other position-sensitive detectors, such as avalanche diodes and the like.

Imaging devices, including medical imaging equipment, such as the PET devices as mentioned above, represent another important application for invention scintillator compositions and radiation detectors. In PET applications, a radiopharmaceutical or detectable label is administered to a patient and may become concentrated within a specific tissue or organ. Radionuclides from the compound decay and emit positrons. When the positrons encounter electrons, they are annihilated and converted into photons, or gamma-rays. The PET scanner can locate these "annihilations" and thereby reconstruct an image of the tissue/organ for observation. The detector modules in the scanner usually include a number of "cameras" or "detectors", along with the associated circuitry, for detecting annihilation events and reconstructing an image of the patient's tissue or organ. The technology for operably connecting the radiation detector (containing a scintillator) to a PET device is also well known in the art, e.g., U.S. Pat. No. 4,559,597; U.S. Pat. No. 6,255,655; U.S. Pat. No. 6,624,422.

For example, where the scintillators are fast scintillators, the compositions of the invention may be particularly useful in certain medical imaging applications, such as PET applications, including time-of-flight (TOF) PET. However, these detectors are not limited to PET cameras. They are also useful, for example, in other applications where fast decay of the light signal is desirable. One such application is X-ray computed tomography (CT), where, as rotation times and individual detector size decreases, detector response time become more important. The high linearity of output of the scintillators of the present invention is of particular use in this type of application.

As will be understood by one of skill in the art, where the invention scintillator compositions are fast scintillators, they may be used, for example, in conjunction with methods to calibrate each detector to correct for differential time lags that confuse relative timing measurements. In particular embodiments, such corrections are performed by introducing hardwired delays of appropriate lengths or by software processing based on pre-stored delay times for each detector. Within the practice of the present invention scintillators are used in individual detectors (detector modules) or read by position-sensitive photodetectors or arrays of photodetectors that detect the light from the scintillation of the crystal or ceramic. For further discussion of fast scintillators and use of scintillator compositions in medical imaging applications, including PET (e.g., TOF), see, for example, commonly owned U.S. Application Publication No. 2005-0104001, which is incorporated herein by reference.

Geological exploration devices, such as well-logging devices, were mentioned previously and represent an important application for these radiation detectors. The assembly containing the scintillator usually includes, for example, an optical window at one end of the enclosure-casing. The window permits radiation-induced scintillation light to pass out of the scintillator assembly for measurement by the photon detection assembly or light-sensing device (e.g., photomultiplier tube, and the like), which is coupled to the scintillator assembly. The light-sensing device converts the light photons emitted from the scintillator into electrical pulses that may be shaped and digitized, for example, by the associated electronics. By this general process, gamma-rays can be detected, which in turn provides an analysis of geological formations, such as rock strata surrounding the drilling bore holes. The technology for operably connecting a radiation detector to a well-logging tube is well-known in the art. The general concepts are described in many references including, e.g., U.S. Pat. Nos. 5,869,836 and 6,872,937. See also, e.g., commonly owned U.S. application Ser. No. 11/233,715, which is herein incorporated by reference.

In many of the applications of a scintillator composition as set forth above (e.g., nuclear weapons monitoring and detection, imaging, well-logging, and PET technologies, and the like), certain characteristics of the scintillator are desirable, including high light output, fast rise time and short decay time, good timing resolution, and suitable physical properties. Certain scintillator performance characteristics can be important in selecting a scintillator for use in particular radiation detection devices and applications. For example, PET scanners typically require a fast scintillator that has good light output characteristics. Similarly, for CT scanners, a scintillator having good light output and good timing resolution is generally desired. For well-logging applications, for example, scintillators that can withstand higher temperatures, or have higher melting temperatures, are generally desired.

The present invention is expected to provide $Lu_xY_{(1-x)}Xa_3$ scintillator materials which can provide the desired high light output and initial photon intensity characteristics for demanding applications of the technologies. Moreover, the invention scintillator compositions are also expected to simultaneously exhibit the other important properties noted above, e.g., fast rise time, short decay time, good stopping power, and timing resolution. Furthermore, the scintillator materials are also expected to be produced efficiently and economically, and also expected to be employed in a variety of other devices which require radiation/signal detection (e.g., gamma-ray, X-ray, and the like).

The following examples are intended to illustrate but not limit the invention.

EXAMPLE 1

The present example provides a method for growing and provides characterization for $Lu_xY_{(1-x)}I_3$ scintillator crystals. The following examples are offered by way of illustration, not by way of limitation.

Crystal Growth of $Lu_{0.7}Y_{0.3}I_3$ $Lu_{0.7}Y_{0.3}I_3$ has hexagonal crystal structure and its density is less than 5.6 g/cm$^3$ (LuI$_3$). The compound melts congruently at about 997-1050° C. and therefore its crystals can be grown using melt based methods such as Bridgman and Czochralski. This is fortunate because these melt-based processes are well suited for growth of large volume crystals (Brice, *Crystal Growth Processes*, Blackie Halsted Press (1986)). The Bridgman method has been used for growing $Lu_{0.7}Y_{0.3}I_3$ crystals because this technique is easy to implement, and can provide a good indication of the feasibility of producing high quality crystals of $Lu_{0.7}Y_{0.3}I_3$ from the melt. Both the vertical and horizontal orientations of the Bridgman method can be used in producing crystals. The vertical Bridgman method is more commonly used in scintillator crystal production, although the horizontal approach differs in several aspects including, for example, production of sharper definition of critical liquid/solid interface; less stress on the crystal during solidification and cooling; and simple implementation of a zone leveling process to achieve uniform dopant concentration across the length of the ingot. The vertical Bridgman method was used in producing crystals examined and discussed below in Example 1. Further crystal production and refinement, however, will be performed.

Prior to actual Bridgman growth, $LuI_3$ and $YI_3$ doped with an appropriate amount of $Ce^{3+}$ was prepared. A concentration of 2% $Ce^{3+}$ was evaluated, although a wide range of additional concentrations can also be utilized (e.g., 0.1%, 1-5%, 5-20%, 10%, 20%, 30%, 40%, 50%, 60%, and up to or less than 100%). Ultra-dry, high purity (e.g., 99.99% purity) $LuI_3$ and $YI_3$ were used and $Ce^{3+}$ was incorporated in a range of about 2.0% (on a molar weight basis) by adding $CeI_3$ to the mixture. These constituents were mixed and then placed in an ampoule (e.g., quartz, tantalum, or glassy carbon crucibles). The ampoule was evacuated, sealed and then heated in a single zone furnace to a temperature above the melting point of $LuI_3$, $YI_3$ and $CeI_3$ (e.g., above about 1050° C. and below about 1100° C.), thus allowing the constituents to mix and react in the melt phase to form $Lu_xY_{(1-x)}I_3$:Ce. Upon cooling, the solid phase of $Lu_{0.7}Y_{0.3}I_3$:Ce was available for use as feed material for the Bridgman growth process. A single zone furnace was used at a temperature of 1084° C. A growth rate of about 1.2-5.8 mm/hr was used to produce the crystals described herein.

In an alternative embodiment a two zone Bridgman furnace, can be used for $Lu_{0.7}Y_{0.3}I_3$:Ce growth. In use, the higher temperature zone ($T_1$) of the furnace was kept above the melting point of the compound, and the lower temperature zone ($T_2$) was maintained below the melting point. Thus, feed material in the furnace first melts while in the zone defined by $T_1$ and then crystallizes out in the zone defined by $T_2$. The speed at which the solid-liquid interface is moved, as determined by the temperature gradient in the furnace, and the shape of the interface are parameters influential in growing high quality crystals. In a second embodiment, a two zone furnace is used, the temperature $T_1$ is set at 1100° C., while the temperature $T_2$ is about 950° C. The value of $T_2$ keeps the bottom zone temperature below the melting point of one of the major constituents, $YI_3$=997° C. Growth rate (e.g., the rate of motion of zone $T_1$) effects how close the conditions at the solid-liquid interface come to equilibrium and, at very slow rates, the system operates close to equilibrium. Typical growth rates for the Bridgman process are about 1-10 mm/hr. Growth rates ranging from about 1 mm/day to about 1 cm/hr may be utilized. Additionally, in some instances zone leveling of the ingot may be performed in order to maintain a uniform $Ce^{3+}$ doping level over its entire length.

Scintillation Properties of $Lu_xY_{(1-x)}I_3$

Scintillation properties of small Bridgman grown $Lu_{0.7}Y_{0.3}I_3$ crystals ($\leq 0.3$ cm$^3$) have been characterized. This investigation involved measurement of the light output, the emission spectrum, and the fluorescent decay time of the crystals.

1. Light Output

Figure 1:
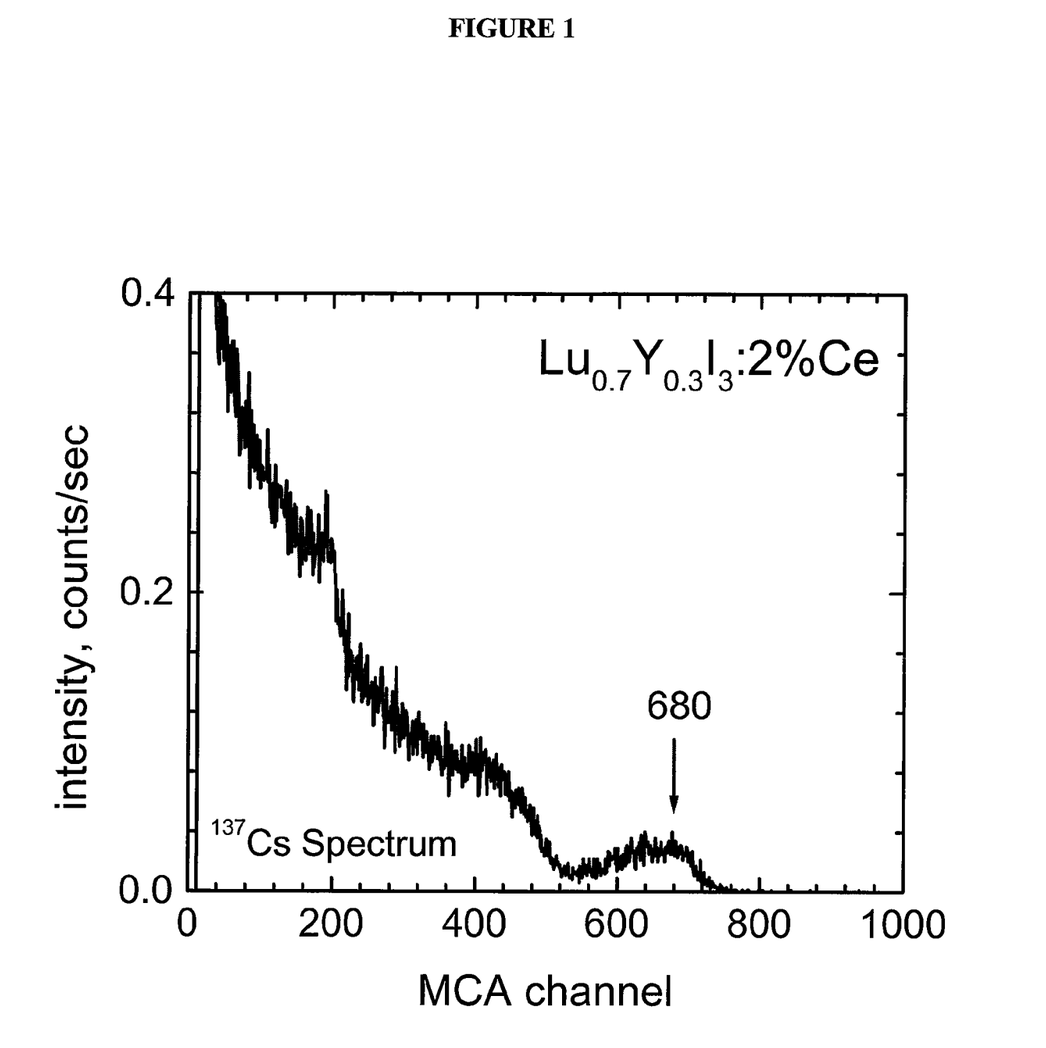
FIG. 1 depicts a $^{137}Cs$ spectra collected with $Lu_{0.7}Y_{0.3}I_3$: 2% Ce coupled to a PMT. The light output of $Lu_{0.7}Y_{0.3}I_3$:2% Ce has been estimated to be about 46,000 photons/MeV.

The light output of $Lu_{0.7}Y_{0.3}I_3$ crystals was measured by comparing their response to 662 keV γ-rays ($^{137}$Cs source) to the response of a calibrated BGO scintillator to the same isotope (see FIG. 1). This measurement involved optical coupling of a $Lu_{0.7}Y_{0.3}I_3$ crystal to a photomultiplier tube (with multi-alkali S-20 photocathode), irradiating the scintillator with 662 keV photons and recording the resulting pulse height spectrum. In order to maximize light collection, the $Lu_{0.7}Y_{0.3}I_3$ crystal was wrapped in reflective, white Teflon tape on all faces (except the one coupled to PMT). An index matching silicone fluid was also used at the PMT-scintillator interface. A pulse height spectrum was recorded with a $Lu_{0.7}Y_{0.3}I_3$ crystal. This experiment was then repeated with a calibrated BGO scintillator. Comparison of the photopeak position obtained with $Lu_{0.7}Y_{0.3}I_3$ for 662 keV photon energy to that with BGO provided an estimation of light output for the $Lu_{0.7}Y_{0.3}I_3$ crystal. BGO demonstrated a peak position at about 110 CH. FIG. 1 shows the pulse height spectrum for $Lu_{0.7}Y_{0.3}I_3$:2% Ce under $^{137}$Cs irradiation and amplifier shaping time of 4.0 µsec. This shaping time is long enough to allow full light collection from both the scintillators. The PMT bias and amplifier gain were the same for both spectra. Based on the recorded photopeak positions for $Lu_{0.7}Y_{0.3}I_3$ and BGO, and by taking into account the photocathode quantum efficiency for BGO and $Lu_{0.7}Y_{0.3}I_3$, light output of $Lu_{0.7}Y_{0.3}I_3$ crystal was estimated to be about 46,000 photons/MeV.

2. Emission Spectrum

Figure 2:
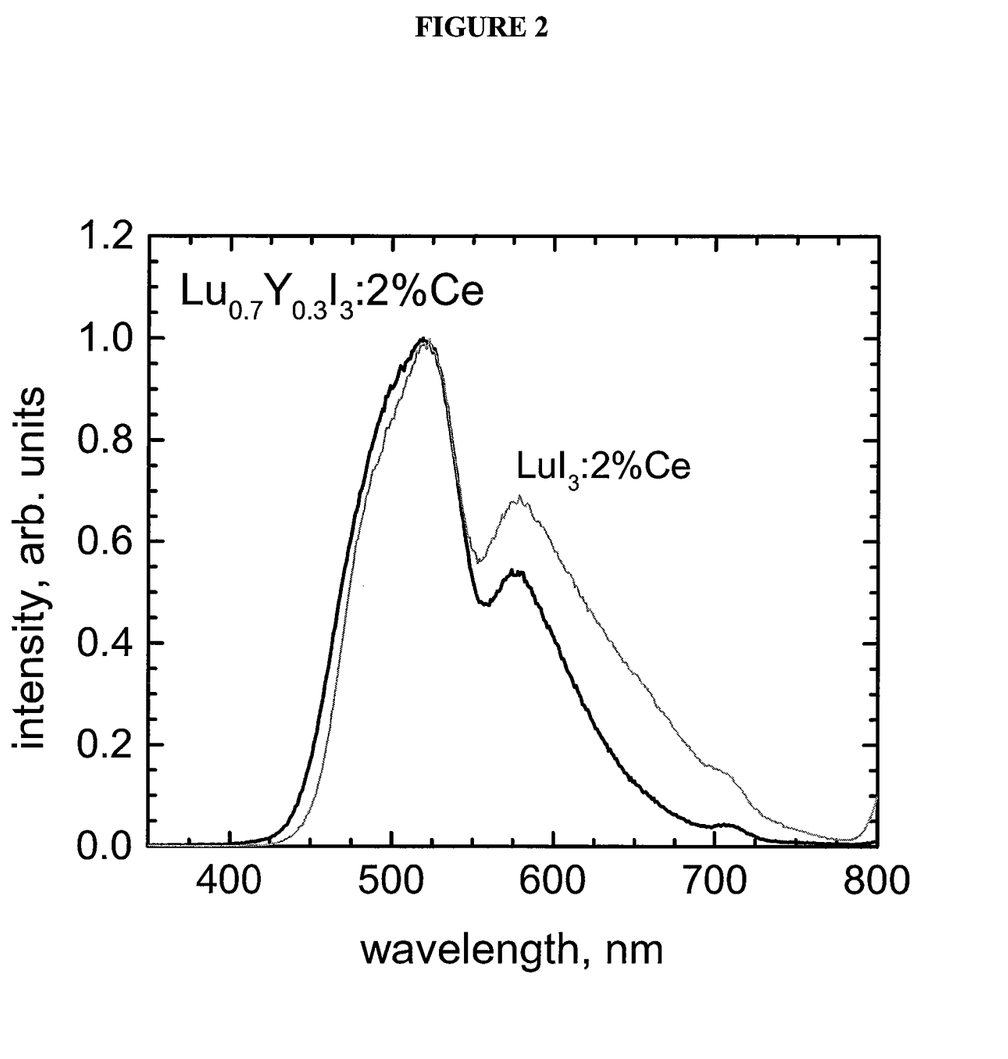
FIG. 2 depicts the optical emission spectrum for a $Lu_{0.7}Y_{0.3}I_3$:2% Ce scintillator upon exposure to X-rays. The optical emission spectrum for $LuI_3$:2% Ce upon exposure to X-rays is shown for comparison.

The emission spectrum of a $Lu_xY_{(1-x)}I_3$ scintillator has been measured. The $Lu_{0.7}Y_{0.3}I_3$ sample was excited with radiation from a Philips X-ray tube having a Cu target, with power settings of 30 kVp and 15 mA. The scintillation light was passed through a McPherson monochromator and detected by a Burle C31034 photomultiplier tube. A normalized emission spectrum for a $Lu_{0.7}Y_{0.3}I_3$ sample, and a $LuI_3$:2% Ce sample (for comparison), is shown in FIG. 2. The peak emission wavelength for the $Lu_{0.7}Y_{0.3}I_3$ sample was at about 520 nm and this emission was anticipated to be due to 5d→4f transition of $Ce^{3+}$. The peak emission wavelength for $Lu_{0.7}Y_{0.3}I_3$ is attractive for gamma-ray spectroscopy because it matches well with the spectral response of photomultiplier tubes as well as a new generation of silicon photodiodes.

3. Decay Time

Figure 3:
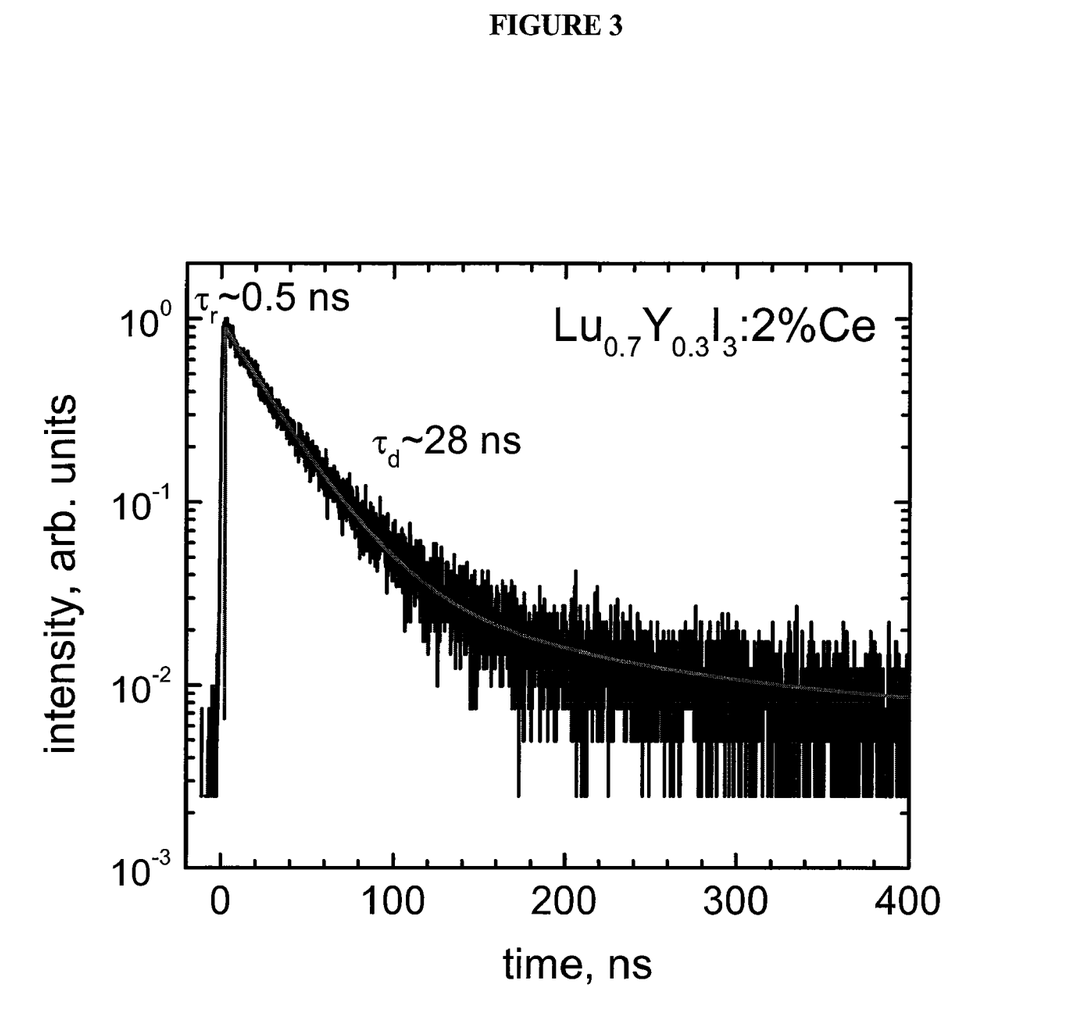
FIG. 3 depicts the time profile, including decay-time spectrum, for a $Lu_{0.7}Y_{0.3}I_3$:2% Ce scintillator.

Decay-time spectrum of a $Lu_{0.7}Y_{0.3}I_3$ crystal has been measured using the delayed coincidence method (Bollinger and Thomas, *Rev. Sci. Instr.* 32:1044 (1961)). FIG. 3 shows the decay-time spectrum recorded for a $Lu_{0.7}Y_{0.3}I_3$ sample along with a theoretical fit (with an exponential rise and decay time plus background) to the data. The decay time for the sample was about 28 ns and this component covered all of the integrated light output of the sample. This decay component can be attributed to optical emission arising from direct capture of electron-hole pairs at the $Ce^{3+}$ sites. The rise time of the scintillation pulse from $Lu_{0.7}Y_{0.3}I_3$ has been estimated to be approximately 0.5 ns. The initial photon intensity, a figure of merit for timing applications, has been estimated to be approximately 1640 photons/(ns×MeV) for $Lu_{0.7}Y_{0.3}I_3$. These measurements confirm that $Lu_xY_{(1-x)}I_3$ has a high light output and fast response.

Although the invention has been described with reference to the above examples, it will be understood that modifications and variations are encompassed within the spirit and scope of the invention. Accordingly, the invention is limited only by the following claims along with their full scope of equivalents. All publications and patent documents cited in this application are incorporated by reference in their entirety for all purposes to the same extent as if each individual publication or patent document were so individually denoted.

What is claimed is:

1. A scintillator, comprising a composition having the formula $Lu_xY_{(1-x)}Xa_3$, wherein Xa is a halide; $0 \leq x \leq 1$; and a dopant.

2. The scintillator of claim 1, wherein the scintillator is a fast scintillator.

3. The scintillator of claim 2, wherein the scintillator comprises a decay-time constant of less than substantially 50 nanoseconds (ns).

4. The scintillator of claim 2, wherein the scintillator comprises a decay-time constant of less than substantially 30 ns.

5. The scintillator of claim 2, wherein the scintillator comprises an initial photon intensity of greater than substantially 1000 Photons/ns×MeV.

6. The scintillator of claim 1, wherein the scintillator comprises a light output of greater than substantially 30,000 Photons/MeV.

7. The scintillator of claim 1, wherein the scintillator comprises a light output of greater than substantially 40,000 Photons/MeV.

8. The scintillator of claim 1, wherein the halide is iodide or bromide.

9. The scintillator of claim 1, wherein X is less than 1.

10. The scintillator of claim 1, wherein X is greater than substantially 0.1.

11. The scintillator of claim 1, wherein X is substantially 0.7.

12. The scintillator of claim 8, wherein the dopant comprises Ce, La, Eu, Pr, Sm, Sr, Tl, Cl, F, or I.

13. The scintillator of claim 12, wherein the dopant comprises a mixture of at least two dopants.

14. The scintillator of claim 12, wherein said dopant is present at substantially 0.1% or more and less than or equal to substantially 100% by molar weight.

15. The scintillator of claim 12, wherein said dopant is present in an amount of from substantially 0.1% to substantially 5.0% by molar weight.

16. The scintillator of claim 12, wherein said dopant is present in an amount of from substantially 5.0% to substantially 20% by molar weight.

17. The scintillator of claim 1, wherein said dopant is Ce and present in an amount of substantially 2.0% by molar weight.

18. The scintillator of claim 17, wherein the scintillator comprises a crystal composition.

19. A radiation detection device, comprising a detector assembly comprising a scintillator comprising a composition having the formula $Lu_xY_{(1-x)}Xa_3$, wherein Xa is a halide, 0<x<1, and a dopant; and a light photon detection assembly.

20. The device of claim 19, wherein X is less than 1.

21. The device of claim 19, wherein X is greater than substantially 0.1.

22. The device of claim 19, wherein X is substantially 0.7.

23. The device of claim 19, wherein the halide is iodide or bromide.

24. The device of claim 23, wherein the dopant comprises Ce, La, Eu, Pr, Sm, Sr, Tl, Cl, F, or I.

25. The device of claim 19, wherein the device is a positron emission tomography (PET) imaging device.

26. The device of claim 19, wherein the device is an X-ray computed tomography (CT) imaging device.

27. The device of claim 19, wherein the device is a well-logging device.

28. The device of claim 27, wherein the scintillator comprises a crystal composition.

29. The device of claim 19, further comprising a data analysis system.

30. The device of claim 19, wherein the light photon detection assembly comprises a photomultiplier tube, a photo diode, a PIN detector, or an avalanche detector.

31. An X-ray detector assembly, comprising: a scintillator comprising a composition having the formula $Lu_xY_{(1-x)}Xa_3$, wherein Xa is a halide, 0<x<1, and a dopant; a light photon detection assembly; and a data analysis system.

32. The assembly of claim 31, wherein the light photon detection assembly comprises a photomultiplier tube, a photo diode, a PIN detector, or an avalanche detector.

33. The assembly of claim 31, wherein the scintillator is coated with a reflective layer, a moisture resistant layer, or a vapor barrier.

34. The assembly of claim 31, wherein the assembly comprises a digital X-ray imaging device.

35. A method of performing radiation detection, comprising: providing a detection device comprising a detector assembly comprising a scintillator comprising a composition having the formula $Lu_xY_{(1-x)}Xa_3$, wherein Xa is a halide, 0<x<1, and a dopant, and a light photon detection assembly; and positioning a target within a field of view of the scintillator as to detect emissions from the target.

* * * * *